United States Patent

Miura et al.

Patent Number: 5,701,257
Date of Patent: Dec. 23, 1997

[54] SHOCK MEASURING METHOD IN GOODS TRANSPORTATION

[75] Inventors: Shinsuke Miura, Mishima; Takeshi Itoi, Kawasaki; Shuichi Yabushita, Yokohama, all of Japan

[73] Assignee: Yamaichi Electronics Co., Ltd., Tokyo, Japan

[21] Appl. No.: 581,838

[22] Filed: Jan. 2, 1996

[51] Int. Cl.⁶ .................................................. G01H 11/00
[52] U.S. Cl. ...................... 364/508; 364/552; 364/550; 364/505; 364/566; 364/551.01; 73/669; 73/781; 73/12.01
[58] Field of Search ................... 364/508, 424.05, 364/552, 567, 550, 505, 566, 551.01; 73/669, 781, 12.01; 414/788.7

[56] References Cited

U.S. PATENT DOCUMENTS

| | | | |
|---|---|---|---|
| 4,745,564 | 5/1988 | Tennes et al. | 364/566 |
| 4,779,461 | 10/1988 | Gilman et al. | 73/384 |
| 4,862,394 | 8/1989 | Thompson et al. | 364/551.01 |
| 5,100,096 | 3/1992 | Mizuno et al. | 248/638 |
| 5,189,614 | 2/1993 | Mitsuoka et al. | 364/424.05 |
| 5,539,640 | 7/1996 | Kishimoto et al. | 364/424.05 |

OTHER PUBLICATIONS

Bump recorder type 2503, instruction manual (033–0458), Jun. 1978.

*Primary Examiner*—Emanuel T. Voeltz
*Assistant Examiner*—Hien Vo
*Attorney, Agent, or Firm*—Wenderoth, Lind & Ponack

[57] ABSTRACT

A shock measuring method for detects shocks during transportation by a sensor and stores such detected shock data. The shock measuring method in goods transportation being characterized in that measuring conditions 1, 2, . . . n whose sequential order is pre-established are progressively fed in accordance with the sequential order for each transportation section, and shock data for each transportation section measured under each measuring condition 1, 2, . . . n for each transportation section are stored in accordance with the sequential order.

6 Claims, 7 Drawing Sheets

SHOCK MEASURING METHOD IN GOODS TRANSPORTATION

BACKGROUND OF THE INVENTION

1. Field of the Invention

This invention relates to a shock measuring method for measuring a shock applied to transportation goods during long distance transportation, goods transportation requiring change in transportation condition, and the like.

2. Brief Description of the Prior Art

There are known shock measuring devices, as represented by Japanese Patent Publication No. Sho 60-54626, in which a shock applied to goods during transportation is measured by a sensor, a peak value exceeding a threshold level is stored, and the time of generation of this peak value is specified and stored. Any one of those conventional shock measuring devices is operated under fixed measuring conditions over the entire transportation distance.

Recently, as the goods to be transported, transportation means, transportation route and packaging means became very versatile, the mode and type of vibration and its frequency component, etc. also became very versatile. This makes it difficult for the single-way measuring method as employed in the conventional method to appropriately grasp the actual states of various shocks applied to the transportation goods on the long distance transportation route. Therefore, it is very difficult to use the data obtained by the conventional measuring method for improving the transportation conditions.

SUMMARY OF THE INVENTION

It is, therefore, a general object of the present invention to provide a shock measuring method in goods transportation which is capable of remarkably improving the transportation conditions.

According to the present invention, there is essentially provided, in order to achieve the above object, a shock measuring method for detecting a shock during transportation by a sensor and storing such detected shock data. The shock measuring method in goods transportation being characterized in that measuring conditions 1, 2, ... n whose sequential order is pre-established are progressively fed in accordance with the sequential order for each transportation section, and shock data for each transportation section measured under each measuring condition 1, 2, ... n for each transportation section are stored in accordance with the sequential order. It is preferred that the progressive transfer of the measuring conditions 1, 2, ... n in accordance with the sequential order is made based on a timer setting. In the alternative, the progressive transfer of the measuring conditions 1, 2, ... n in accordance with the sequential order may be made based on position data in a transportation route or on an external command such as by actuating a control switch.

From another aspect of the invention, there is provided a shock measuring method for detecting a shock during transportation by a sensor and storing such detected shock data. The shock measuring method in goods transportation being characterized in that measuring conditions 1, 2, ... n are preliminarily stored, one of the measuring conditions 1, 2, ... n is selected in accordance with a transportation condition and shock data measured under such selected measuring condition are stored.

The actual situation of goods transportation is that goods are repeatedly transported on the same transportation route by the same transportation means or goods are transported on the same transportation route but they are transferred to some other transportation means in the midway through the transportation. In most cases, this pattern is repeated. According to the teaching of the present invention, the transportation route is divided into a plurality of sections and transportation conditions from 1 to n for each section are preliminarily stored in the memory unit and the measuring conditions are progressively fed in accordance with the given sequential order every time each section is reached. According to this arrangement, a shock occurred in a certain section can be measured under the most suitable measuring conditions for that section and such obtained data are gradually stored in the memory unit. By taking out the data thus stored in the memory unit for analysis at a later date, they can be used for improving the transportation conditions.

Furthermore, since a plurality of transportation conditions from 1 to n are preliminarily stored in the memory unit, the optimum measuring conditions can be selected from the preliminarily-stored data depending on the transportation conditions. Thus obtained data can be used for correctly grasping the causes of breakage of the transportation goods and improving the transportation conditions, etc.

The novel features which are considered characteristic of this invention are set out in the appended claims. The invention itself, however, together with additional objects and advantages thereof will be best understood from the following detailed description taken in conjunction with the accompanying drawings which illustrate, by way of example only, a preferred embodiment of this invention.

DETAILED DESCRIPTION OF THE EMBODIMENT

A first embodiment of the present invention will now be described with reference to FIGS. 1 to 5 inclusive. This invention relates to a shock measuring method for detecting a shock during transportation by a sensor 1 such as an acceleration sensor or the like and storing such detected shock data in a shock data memory 9. Measuring conditions 1, 2, ... n whose sequential order is preliminarily established in this shock measuring method are stored in a measuring condition memory 8, those transportation conditions 1, 2, ... n are progressively fed for each transportation section R1, R2, ... Rn in accordance with the sequential order, and shock data for each transportation section measured under each measuring condition 1, 2, ... n for each transportation section are stored in the shock data memory 9 in accordance with the sequential order.

Figure 1:
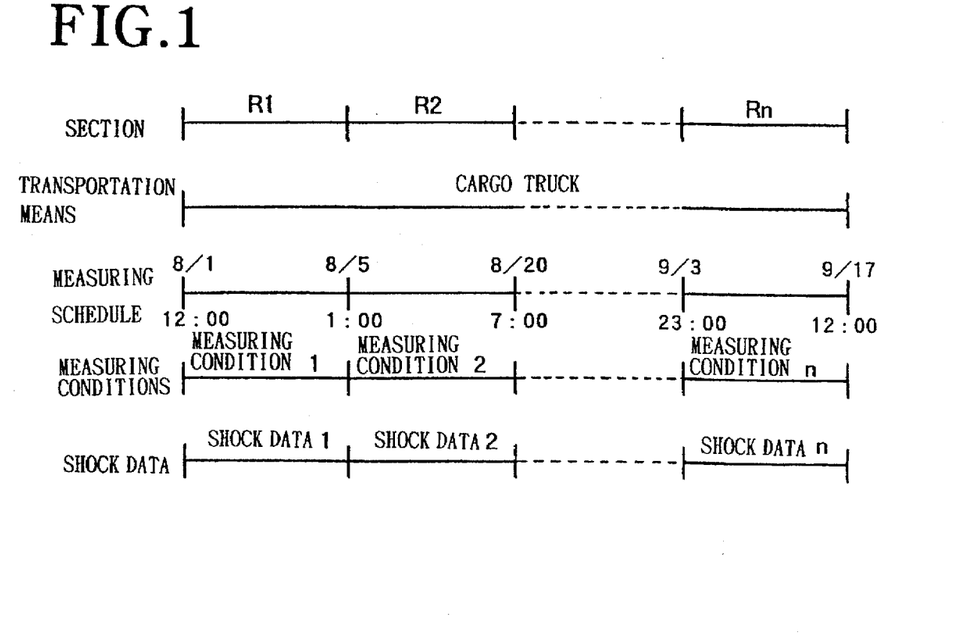
FIG. 1 is an illustration showing a transportation schedule for explaining a first embodiment of the present invention.

As shown in FIG. 1, in the case where goods are transported on a long distance transportation route by the same transportation means, for example, when certain goods are transported over the entire route by the same land transportation means such as a cargo truck or a cargo train, by the same ocean transportation means such as a cargo ship, or by air transportation means such as an air plane, the route is divided into a plurality of sections R1, R2, ... Rn, the above measuring conditions 1, 2, ... n are progressively fed in accordance with the preliminarily established sequential order to obtain a shock data for each transportation section R1, R2, ... Rn, and such obtained data are stored in the shock data memory 9 in accordance with the above-mentioned sequential order.

Figure 2:
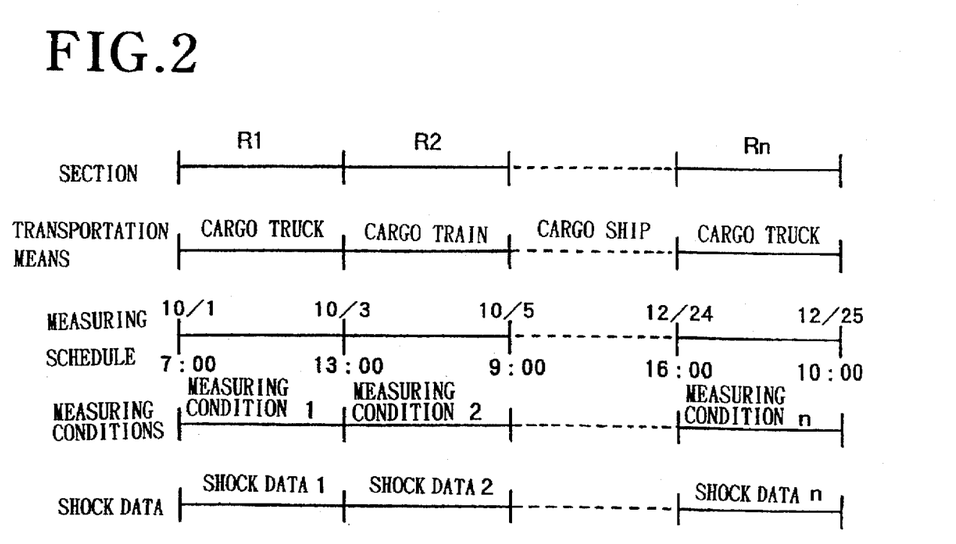
FIG. 2 is an illustration showing a transportation schedule for explaining a second embodiment of the present invention.

As shown in FIG. 2, in the case where certain goods are transferred from one transportation means to another during the long distance transportation route, for example, when the goods are transferred from a cargo truck to a cargo train, then from the cargo train to a cargo ship, and so on, or when air transportation is additionally used somewhere in the foregoing transportation route, or when a crane is used between one transportation means and another, the transportation route is divided into a plurality of sections every time the transportation means is changed from one to another, the measuring conditions 1, 2, ... n are progressively fed in accordance with the preliminarily established sequential order every time each one of the transportation sections is reached, thereby to obtain a shock datum for each transportation section R1, R2, ... Rn in accordance with each transportation means, and such obtained data are stored in the shock data memory 9 in accordance with the given sequential order.

The progressive feeding operation of the measuring conditions 1, 2, ... n in accordance with the given sequential order is made using a timer 4.

Figure 3:
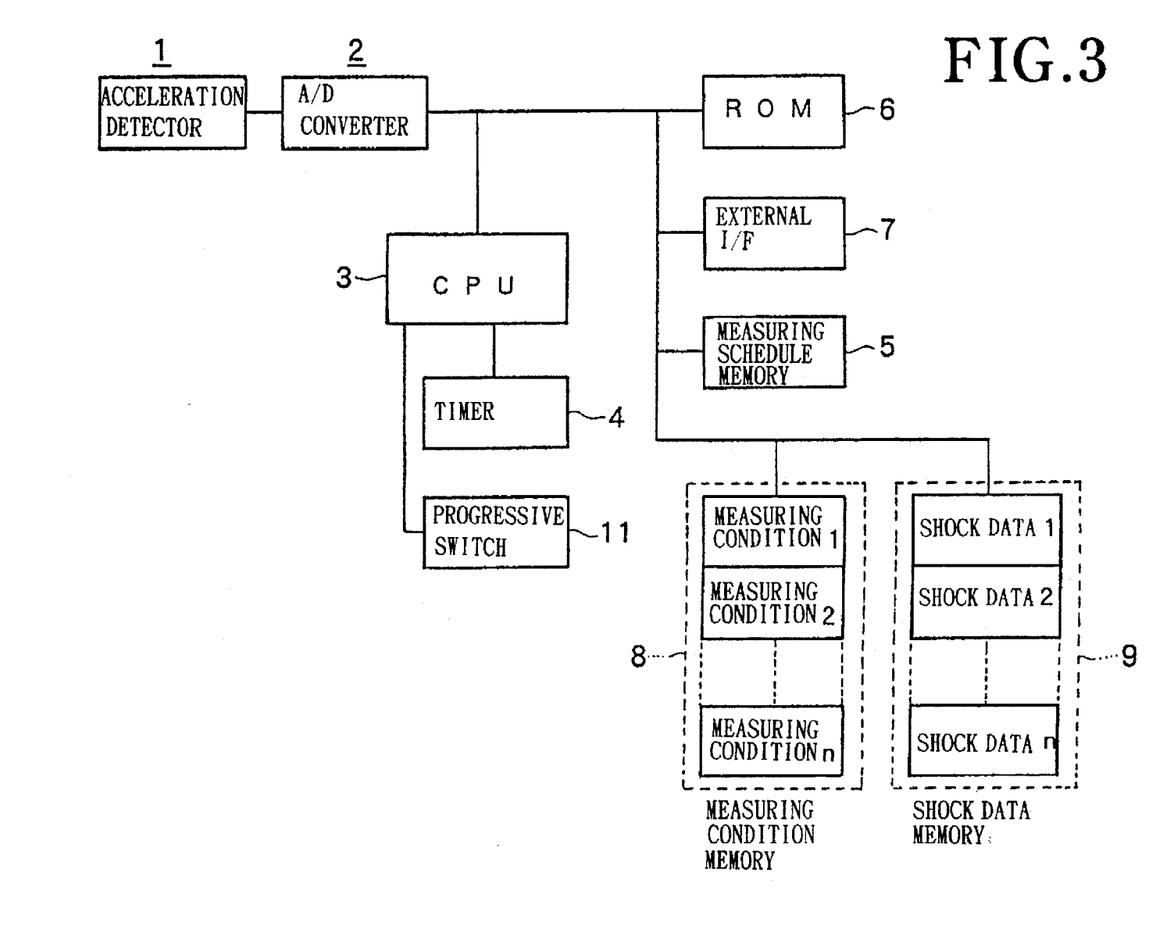
FIG. 3 is a block diagram of a shock measuring device in the first embodiment.
Figure 4:
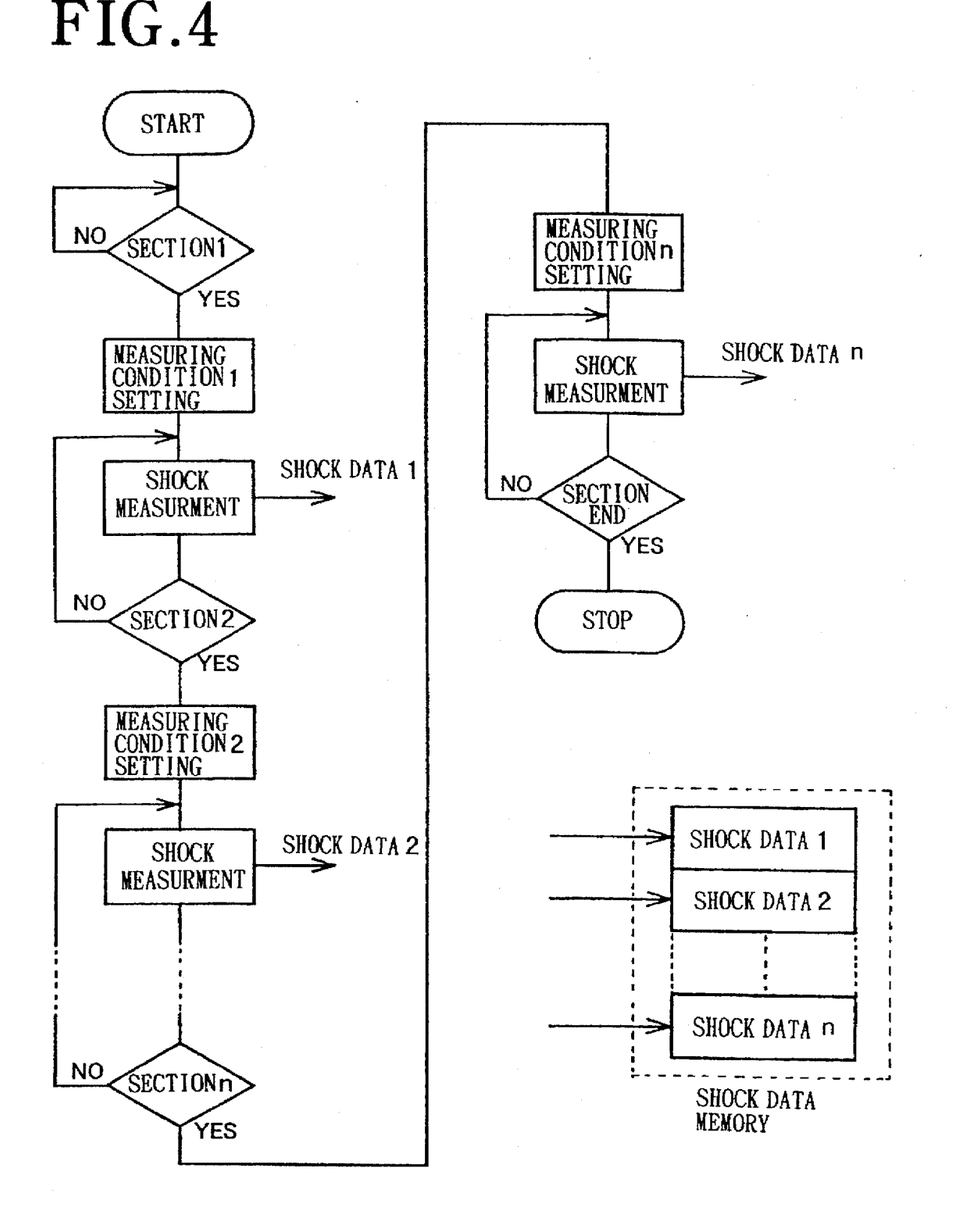
FIG. 4 is a flowchart of the operation of the shock measuring device in the first embodiment.

FIG. 3 shows a block diagram for the case where the above-mentioned operation is made under the control of a micro computer, and FIG. 4 is a flowchart for explaining the operation.

As shown in the illustrations, the device of FIG. 3 includes a sensor 1, an A/D converter 2 for converting the shock data (analog signal) detected by the sensor 1 into a digital signal, a measuring condition memory 8 for storing the measuring conditions 1, 2, ... n, a measuring schedule memory 5 for storing the sequential order of the progressive feed of the measuring conditions 1, 2, ... n and a starting time of the progressive feeding operation, and a shock data memory 9 for storing the shock data measured under a certain measuring condition, which has been progressively fed, in accordance with the given sequential order.

As shown in FIG. 3, the progressive feeding means includes the timer 4. The timer 4 is a means for generating a time signal for determining the time for starting the change of the respective measuring conditions 1, 2, ... n and is also a means for taking out a shock generating time signal.

In FIG. 3, when the CPU 3 judges that it is the time for starting the progressive feeding operation with reference to the time signal from the timer 4 and the progressive feed starting time data stored in the random-number generator 6, the progressive feed command is issued to the measuring condition memory 8, the measuring conditions are progressively changed from the condition 1 to the condition 2 or from the condition to the condition 3 in accordance with the sections R1, R2, ... Rn, only the shock data obtained under such changed measuring conditions are taken in as section shock data in each section, and then the data are stored in the shock data memory 9 at the addresses divided in accordance with the given sequential order.

In the above embodiment, the measuring conditions 1, 2, ... n are measuring factors for determining the presence or absence of measurement of the time duration of shock data exceeding the sampling time, threshold level, measuring range (G level) and threshold level, presence or absence of measurement of a peak value thereof, etc. The conditions of those measuring factors are to be changed. For example, in the measuring condition 1, the sampling time is set to 1 ms, the measuring range is set to 10 G, and the threshold level is set to, for example, 7 G which is a G level of a shock value to be adopted in the measuring range.

Similarly, in the measuring condition 2, the sampling time is set to 0.5 ms, the measuring range is set to 20 G, the threshold level is set to 15 G, and the like.

The measuring conditions 1, 2, ... n refer to the change of sampling time, change of threshold level, etc., and other conditions are also changed in accordance with the change of those conditions. Those conditions include all measuring elements to be measured in this kind of shock measuring device.

Figure 5:
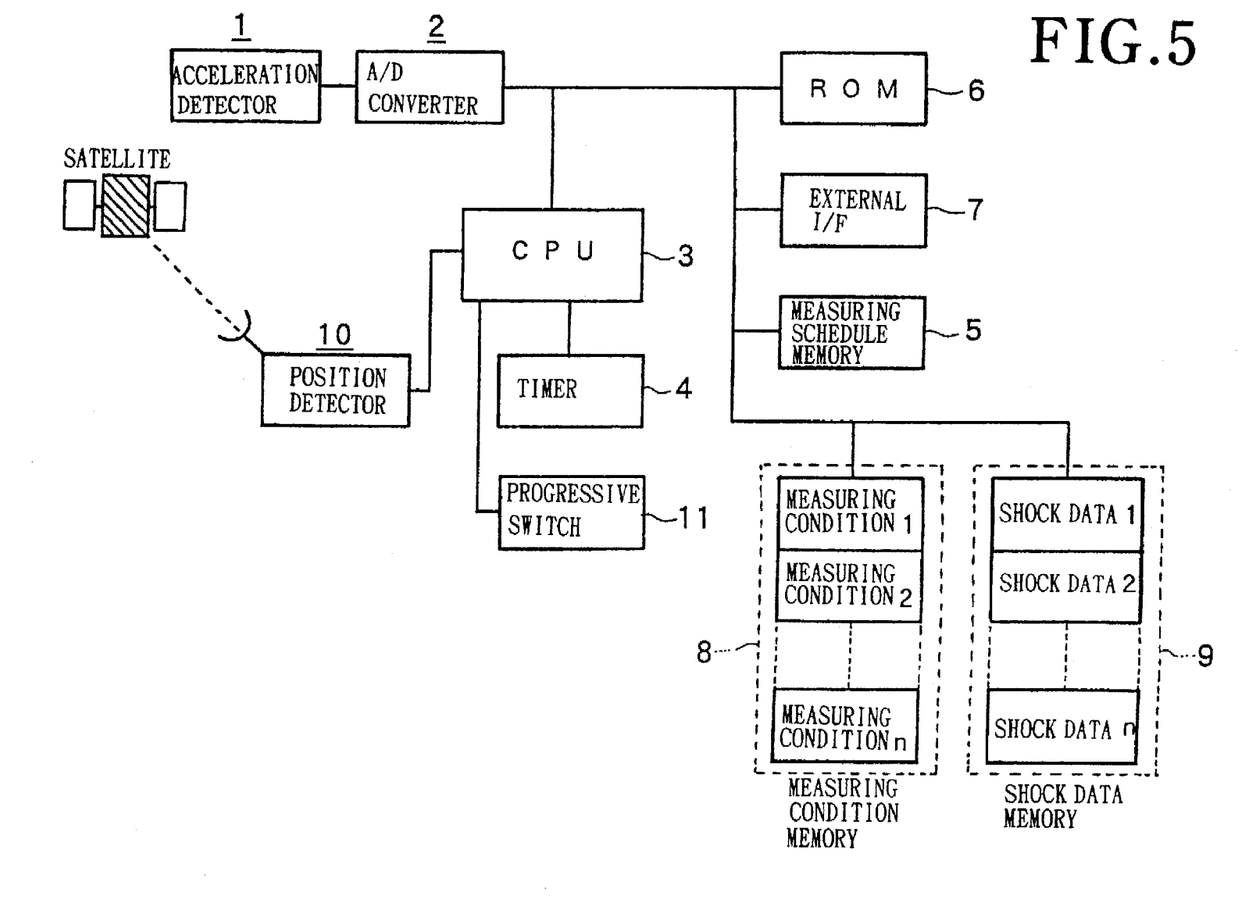
FIG. 5 is a block diagram of a shock measuring device showing one mode of practice in the first embodiment.
Figure 6:
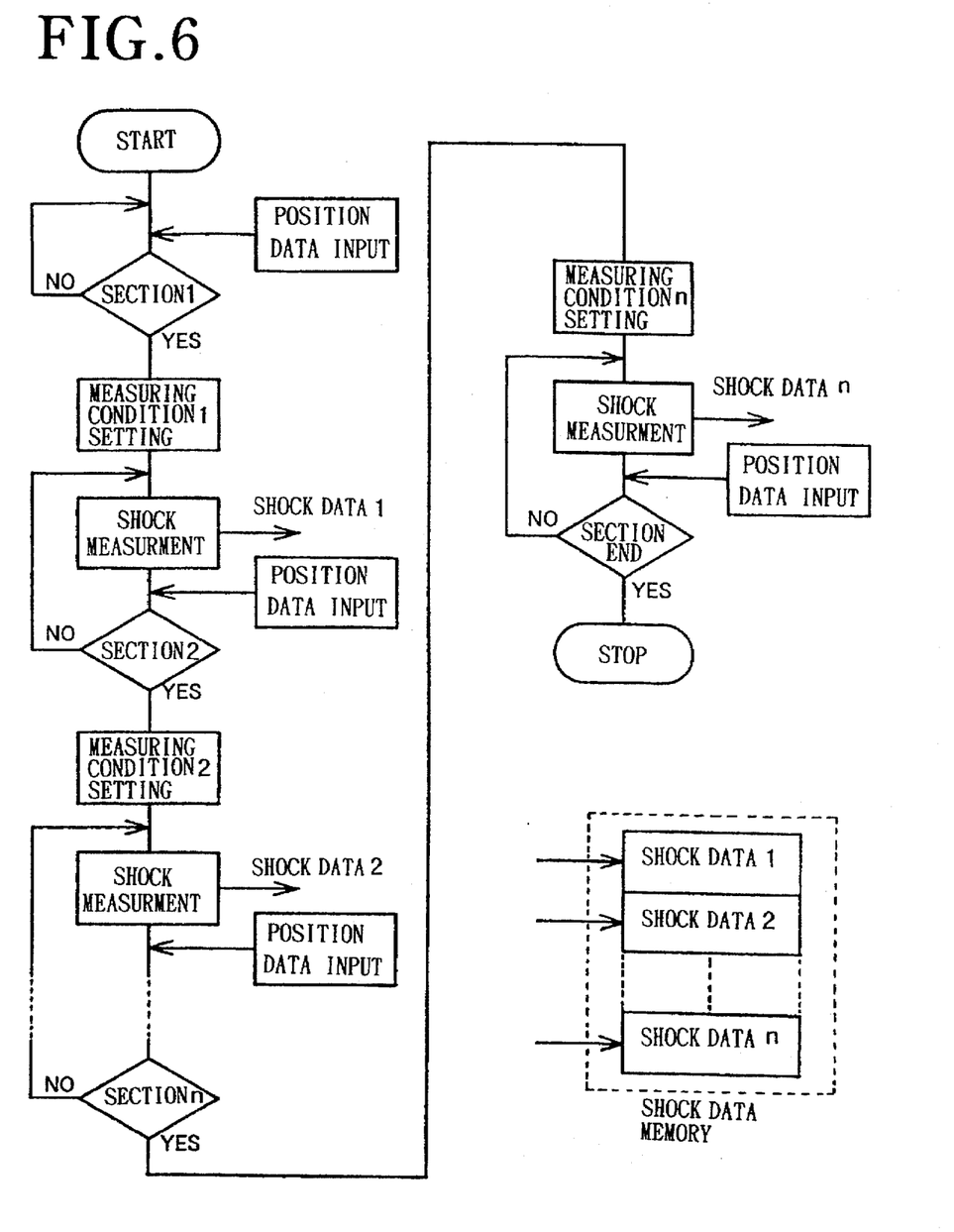
FIG. 6 is a flowchart of the operation of the shock measuring device shown in FIG. 5.

FIGS. 5 and 6 show a general construction of a device which carries out the progressive feeding operation of the measuring conditions 1, 2, ... n based on the position data detected by the position detecting means and a flowchart showing its operation, respectively.

As shown in those illustrations, the position data are obtained by using a global positioning system (GPS) utilizing, for example, a satellite, and position data from the satellite are received by the position detector 10, thereby calculating the latitude and longitude.

The position data output from the position detector 10 are taken into the CPU 3, it is determined whether or not the transportation sections have been reached, the measuring conditions 1, 2, ... n corresponding to the above sections are progressively fed by serving the same as a trigger, the Shock data based on the respective measuring conditions are taken as data in the respective sections, and such taken data are stored in the shock data memory 9 in the given sequential order.

The shock data stored in the shock data memory 9 are subjected to visual observation, waveform analysis or statistic analysis by using an interface 7 attached to the micro computer, connecting an analyzer thereto and display the data in the display unit. Also, the data are output to the surface of a recording paper by a printer, where necessary. By doing this, the effect of the shock applied to the transportation goods can correctly be grasped in order to improve the transportation conditions. In this case, the timer 4 acts as a means for specifying the time of shock generation.

As shown by imaginary lines in FIGS. 3 and 5, as a trigger for progressively feeding the measuring conditions 1, 2, ... n, there can be employed, aside from a means for automatically feeding the measuring conditions 1, 2, ... n in accordance with the position data or time data, a switch means 11 which is manually operated by a worker who determines the transportation position. The determination factors may include position data obtained by using a range finder of an automotive vehicle, a time clock, or a navigation system.

A second embodiment of the present invention will now be described with reference to FIGS. 7 and 8.

Figure 7:
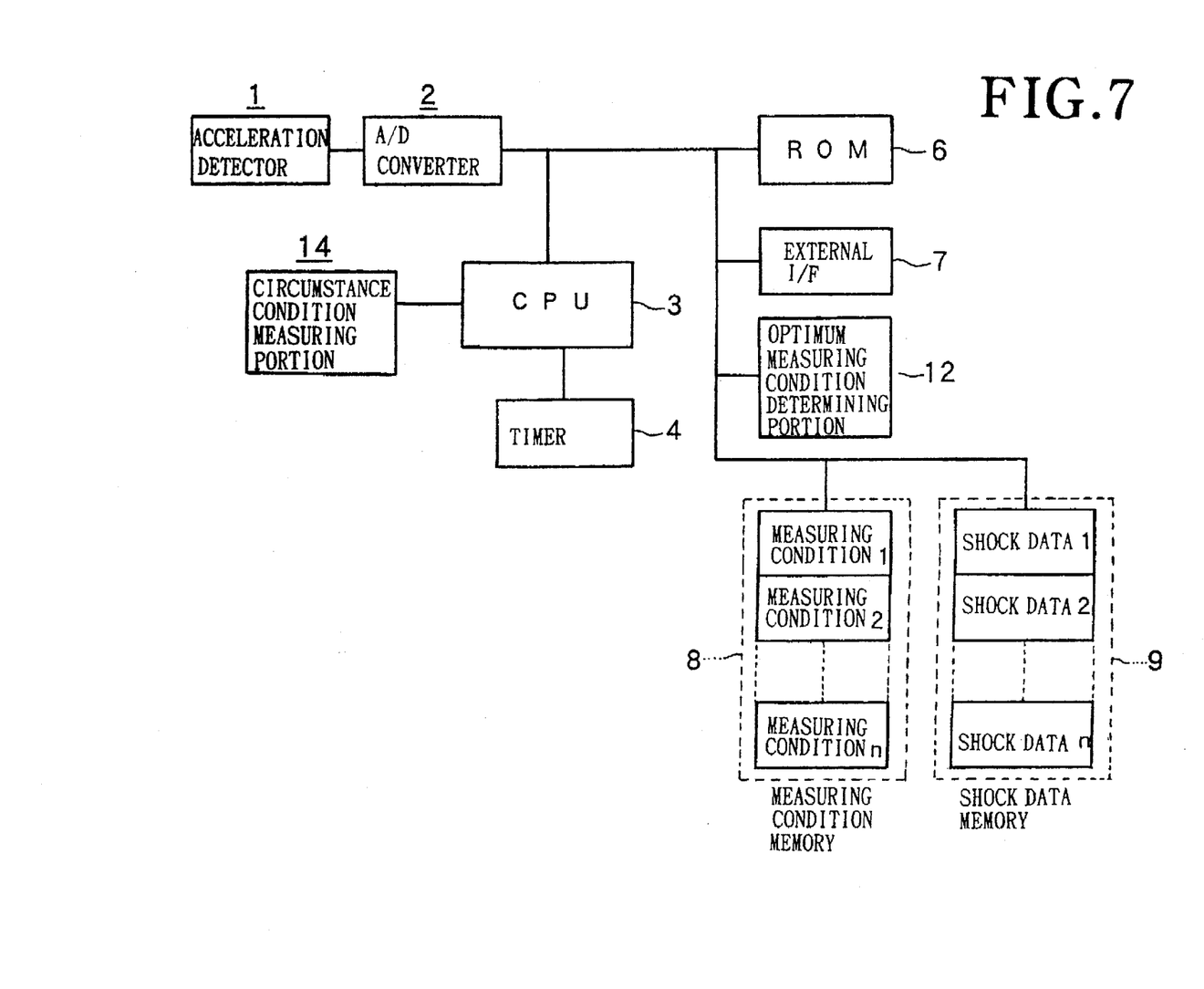
FIG. 7 is a block diagram of a shock measuring device in a second embodiment of the present invention.
Figure 8:
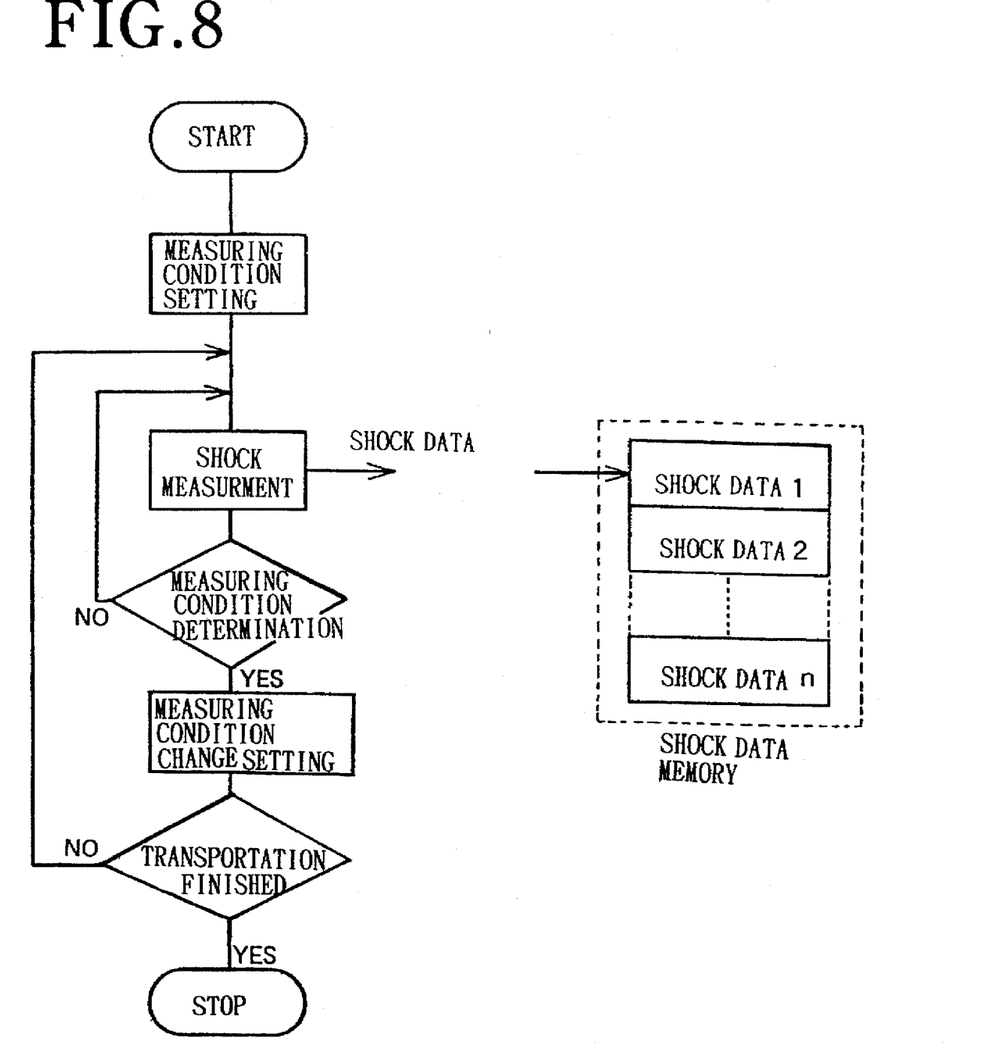
FIG. 8 is a flowchart of the operation of a shock measuring device in the second embodiment.

As shown in FIGS. 7 and 8, this invention is directed to, in a shock measuring method for detecting a shock during transportation by a sensor 1 and storing such detected shock data in a memory 9. The shock measuring method in goods transportation in which measuring conditions 1, 2, . . . n are preliminarily stored in a memory 8, an optimum measuring condition is selected among the measuring conditions 1, 2, . . . n in accordance with transportation condition and shock data measured under such selected measuring condition are stored.

Various measuring conditions, that can be anticipated taking into consideration the transportation route, transportation means, transportation goods, etc., are preliminarily established and stored in the memory 8. This measuring method is particularly suited to be applied to the case in which during the transportation of the long distance transportation route by the same transportation means, the measuring condition is changed from one to another at an optional position or the goods are transferred to another transportation means, because the measurement can be made under the optimum condition selected in accordance with each transportation means.

The measuring conditions can also be made, for example, by judging external factors of vibration such as status of the surface of the transportation road, state of the climate such as a typhoon attacking a ship, etc. for example, external factors adversely affecting the transportation goods such as temperature, moisture and the like, change of speed, etc. Those factors may be subjected to judgment by inputting signals from the various measuring instruments 14 into the determining portion 12, so as to be used for changing the above measuring conditions.

Also, as in the case with the first embodiment, it is possible that the determining operation in the determining portion is carried out by a man and the optimum measuring condition is selected by actuating the control switch.

In FIG. 7, an optimum measuring condition determining portion 12 is a means for automatically changing the measuring conditions to those which are suited for the change in transportation conditions mentioned above. In accordance with the instructions from this optimum measuring condition determining portion 12, the above optimum measuring condition is selected from the measuring conditions 1, 2, . . . n and the shock is measured under the selected optimum measuring condition.

Such obtained shock data are, as in the preceding example, gradually stored in the respective addresses of the memory 9 in accordance with the given sequential order. Then, the data stored in the memory 9 are sent to an analyzing computer or the like through the interface 7 so as to be used for analysis.

In the present invention, the measuring conditions 1, 2, . . . n can be changed both during the measurement and after the measurement. That is, it is considered to be within the scope of the invention that one or some of the conditions are exchanged or the content of a certain condition is changed so as to prepare a stock of new measuring conditions 1, 2, . . . n.

According to the present invention, the transportation conditions from 1 to n for each transportation section of the entire transportation route are preliminarily stored in a memory unit. Then, by progressively feeding the measuring conditions in accordance with the given sequential order every time each section is reached, shock can be measured under a measuring condition most suited to each section. Such obtained data are gradually stored in the memory so that the data can be taken out for analysis at a later date. By doing this, the transportation conditions are remarkably improved.

Also when the transportation goods are to be transported on the same transportation route (railroad, for example) by the same transportation means (train, for example), adverse effects of vibration, etc. to the transportation goods can correctly be determined by totally analyzing the various shock data obtained under the various measuring conditions.

Furthermore, since a plurality of transportation conditions 1, 2, . . . n are preliminarily stored in the memory unit as a sample, the optimum measuring condition can always be selected from the measuring conditions stored in the memory unit in accordance with the transportation conditions. Thus, the present invention is very effective for grasping the causes of breakage of the transportation goods and improving the transportation conditions.

While there has been described what is at present considered to be the preferred embodiments of the invention, it will be understood that various modifications may be made thereto, and it is intended that the appended claims cover all such modifications as fall within the true spirit and scope of the invention.

What is claimed is:

1. A shock measuring method for detecting shocks and storing detected shock data during transportation of goods over an entire transportation route which is divided into a plurality of transportation sections, said method comprising:

storing measuring conditions, respectively representing the transportation sections, in a measuring condition memory;

accessing one of the stored measuring conditions for each respective transportation section;

detecting shocks during the transportation of goods over each one of the plurality of transportation sections under the accessed stored measuring condition corresponding to said one of the plurality of transportation sections; and     storing detected shock data for each detected shock in a shock data memory.

2. A shock measuring method according to claim 1, further comprising:

pre-establishing a sequential order of the stored measuring conditions in accordance with a sequential order of the transportation sections;

wherein the stored measuring conditions are accessed in the pre-established sequential order corresponding to the sequential order of the transportation sections based on a timing signal of a timer and the detected shock data is stored in the preestablished sequential order.

3. A shock measuring method according to claim 1, further comprising:

pre-establishing a sequential order of the stored measuring conditions in accordance with a sequential order of the transportation sections;

wherein the stored measuring conditions are accessed in the pre-established sequential order corresponding to the sequential order of the transportation sections based on position data of the transportation route and the detected shock data is stored in the pre-established sequential order.

4. A shock measuring method according to claim 1, further comprising: pre-establishing a sequential order of the stored measuring conditions in accordance with a sequential order of the transportation sections;

wherein the stored measuring conditions are accessed in the pre-established sequential order corresponding to the sequential order of the transportation sections based on an external command and the detected shock data is stored in the pre-established sequential order.

5. A shock measuring method according to claim 1, wherein the stored measuring conditions are accessed based on an optimum measuring condition selected in accordance with each transportation section.

6. A shock measuring method according to claim 1, wherein the stored measuring conditions are accessed based on an optimum measuring condition selected in accordance with a means for transporting.

* * * * *